(12) United States Patent
Bruss et al.

(10) Patent No.: US 8,056,355 B2
(45) Date of Patent: Nov. 15, 2011

(54) HVAC DRAIN SYSTEM

(75) Inventors: Paul Thomas Bruss, Cedar Falls, IA (US); Kyle D. Seibold, Waterloo, IA (US)

(73) Assignee: Deere & Company, Moline, IL (US)

( * ) Notice: Subject to any disclaimer, the term of this patent is extended or adjusted under 35 U.S.C. 154(b) by 851 days.

(21) Appl. No.: 12/109,036

(22) Filed: Apr. 24, 2008

(65) Prior Publication Data

US 2009/0266099 A1 Oct. 29, 2009

(51) Int. Cl.
*F25D 21/14* (2006.01)
*F25D 21/00* (2006.01)

(52) U.S. Cl. ............................................ 62/285; 62/290

(58) Field of Classification Search ................... 62/285, 62/288, 289, 290, 291, 150, 272; 165/122, 165/53, 231; 415/169.2, 169.4; 137/312, 137/313, 314; 5/606, 928; 210/304, 305, 210/521; 134/186
See application file for complete search history.

(56) References Cited

U.S. PATENT DOCUMENTS

| | | | | |
|---|---|---|---|---|
| 2,082,998 A | * | 6/1937 | Porter | 165/43 |
| 2,133,354 A | * | 10/1938 | Krackowizer | 62/290 |
| 3,165,455 A | * | 1/1965 | Werner et al. | 202/189 |
| 3,848,428 A | | 11/1974 | Rieter, Jr. | |
| 4,098,093 A | | 7/1978 | Czyl | |
| 4,641,502 A | | 2/1987 | Aldrich et al. | |
| 4,687,604 A | * | 8/1987 | Goettl | 261/29 |
| 4,926,655 A | | 5/1990 | King | |
| 5,009,464 A | | 4/1991 | Hasegawa et al. | |
| 5,209,546 A | | 5/1993 | Hasegawa et al. | |
| 5,410,891 A | * | 5/1995 | Ripert | 62/286 |
| 5,791,156 A | | 8/1998 | Strautman et al. | |
| 5,878,592 A | * | 3/1999 | Borges et al. | 62/285 |
| 5,902,008 A | | 5/1999 | Butsuen et al. | |
| 5,938,933 A | | 8/1999 | Williams et al. | |
| 6,286,328 B1 | | 9/2001 | Kawahara | |
| 6,868,689 B1 | * | 3/2005 | McNeil et al. | 62/285 |
| 7,181,925 B2 | * | 2/2007 | Lee et al. | 62/262 |
| 2004/0099000 A1 | * | 5/2004 | Jung et al. | 62/285 |
| 2004/0103927 A1 | * | 6/2004 | Ha | 134/57 R |
| 2005/0109055 A1 | * | 5/2005 | Goetzinger et al. | 62/291 |
| 2008/0060798 A1 | | 3/2008 | Keen | |

FOREIGN PATENT DOCUMENTS

| | | |
|---|---|---|
| DE | 100 15 261 | 10/2000 |
| EP | 1 897 711 | 6/2007 |
| FR | 2 679 986 | 5/1993 |
| WO | 2008 099120 | 1/2008 |

OTHER PUBLICATIONS

John Deere Parts Catalog; pp. 2; printed Apr. 24, 2008.

* cited by examiner

*Primary Examiner* — Judy Swann
*Assistant Examiner* — Alexis K Cox

(57) ABSTRACT

The invention relates to a HVAC drainage system. There is a need for an HVAC drainage system which operates well in a vehicle which moves over rough terrain. An HVAC unit is mounted at a central portion of an inner roof panel over an air inlet opening. A collection recess is formed by the panel and surrounds the air inlet opening. Concentric walls formed by the inner roof panel in the collection recess surrounding the HVAC unit. Each wall has one or more gaps formed therein. The gaps in adjacent walls are mis-aligned with respect to each other so that fluid is prevented from flowing in a straight line through gaps in adjacent walls. Drainage ports are formed in the inner roof panel. Drainage grooves formed in the inner roof panel communicate the collection recess with corresponding drainage ports.

6 Claims, 4 Drawing Sheets

HVAC DRAIN SYSTEM

FIELD OF THE INVENTION

The present invention relates to a drain system for a roof-mounted vehicle heating, ventilation and air conditioning system.

BACKGROUND OF THE INVENTION

It is known to place heating, ventilation and air conditioning (HVAC) systems in the roof of a vehicle, such as a tractor. Such a roof-mounted HVAC system for a tractor is shown in U.S. patent application Ser. No. 11/518,050 filed 8 Sep. 2006 and assigned to the assignee of this application. Such an HVAC system will include an evaporator which condenses water as a byproduct of cooling the air moving through it. Most HVAC units have a drain pan under the evaporator, to collect this water, which is connected to a hose to port it out of the vehicle.

With such a roof mounted HVAC system condensed water from the evaporator sometimes can leak out of its containment area to soak the headliner and drip on the operator's head. Also, with hot coolant overhead there needs to be an efficient way to drain it in the event of a heater coil failure. Upon failure, a heater coil may send several gallons per minute of hot coolant into the roof over the operators head. Most drain systems cannot handle such a failure.

When a vehicle runs for a long time on a steep slope it may lose containment of the water, or if the drain lines do not carry the water away, the water can collect until the attitude of the vehicle changes. This is a very common problem when working on steep slopes and gravity prevents the drain lines from draining the water away. Under these circumstances, the water can collect until the attitude of the vehicle changes, causing spillage.

A drain line can also become plugged by mud, insects, and debris.

There is a need for a drainage system to solve such problems, and to help assure that all condensation is routed to proper drains, despite the vehicle tilting, rolling or bouncing over rough terrain.

SUMMARY OF THE INVENTION

Accordingly, an object of this invention is to provide a liquid and condensation drainage system for a roof-mounted HVAC unit.

Another object of this invention is to provide an HVAC drainage system which can drain hot coolant in the event of a heat coil failure.

This and other objects are achieved by the present invention, wherein a drainage system is provided for roof-mounted HVAC system. A vehicle has a cab with a roof supported on a base by a support system. The roof has an inner roof panel and an HVAC unit mounted on and above an inlet opening in the inner roof panel. An HVAC compartment is formed in a central portion of the inner roof panel. A collection recess is formed by the inner roof panel and surrounds the inlet opening. A plurality of surrounding walls are formed by the inner roof panel in the collection recess. Each wall has a plurality of spaced apart gaps formed therein. The gaps in adjacent walls are mis-aligned with respect to each other so that fluid is prevented from flowing in a straight line through gaps in adjacent walls. Drainage ports are formed in the inner roof panel. Each port communicates with a drainage tube. Drainage grooves formed in the inner roof panel communicate between the collection recess and the corresponding drainage ports.

DESCRIPTION OF THE PREFERRED EMBODIMENT

Figure 1:
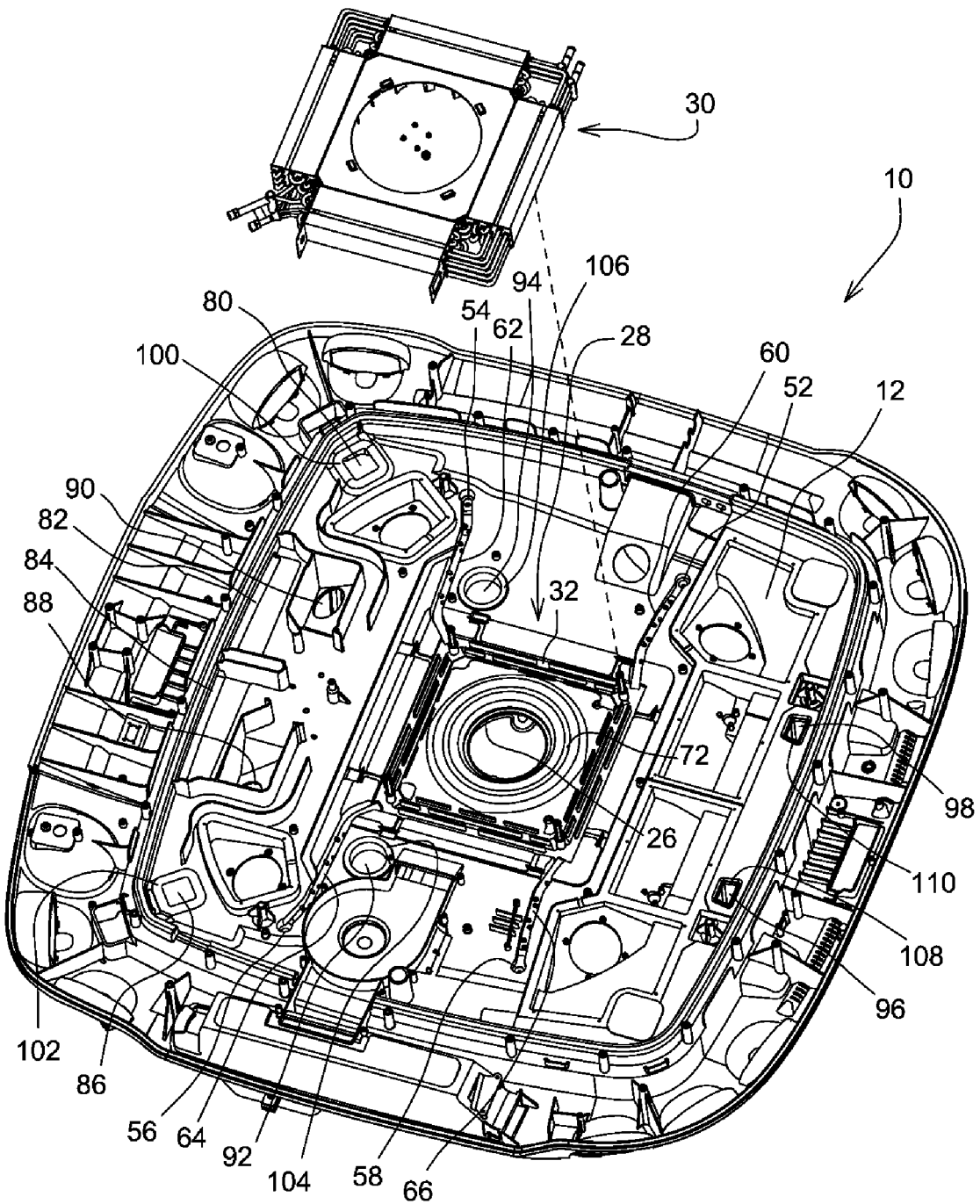
FIG. 1 is a perspective assembly view of a vehicle cab inner roof panel with a HVAC drainage system embodying the invention.

Referring to FIG. 1, a vehicle roof assembly 10 includes an inner roof panel 12 supported by a frame (not shown). The roof panel 12 includes a central air inlet opening 26 surrounded by an HVAC compartment 28 over which is mounted an HVAC unit 30. The roof panel 12 and HVAC unit 30 is preferably covered by a conventional upper or outer roof panel (not shown). The panel 12 forms a collection recess 32 in the outer peripheral portion of the HVAC compartment.

Figure 2:
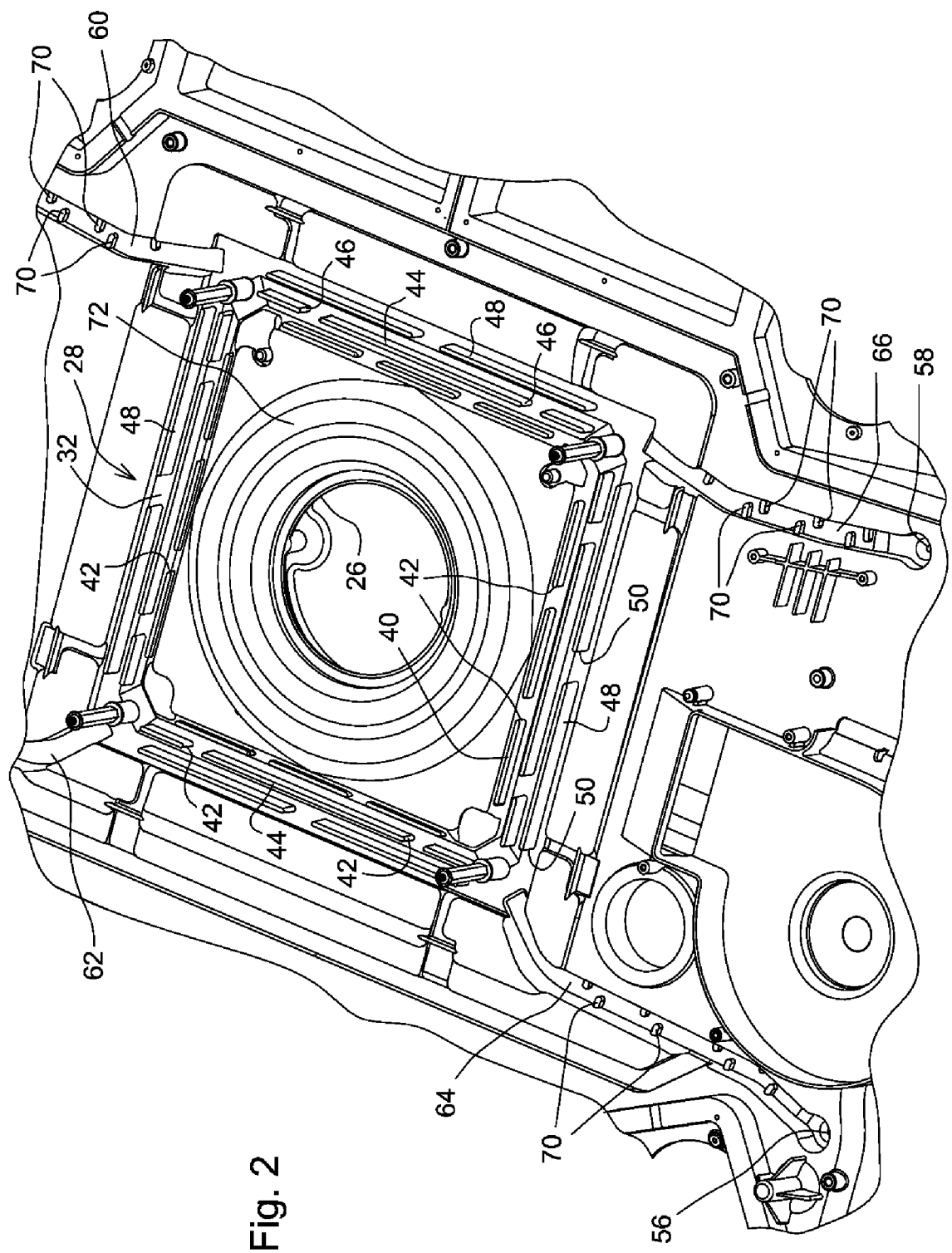
FIG. 2 is an enlarged perspective view of a central portion of the inner roof panel of FIG. 1.

A first or inner wall 40 (FIG. 2) is formed by the inner roof panel 12 in the collection recess 32. Wall 40 surrounds the HVAC compartment 28. A plurality of spaced-apart first gaps 42 are formed in the first wall 40. A second or intermediate wall 44 is formed by the inner roof panel 12 in the collection recess 32 and surrounds the first wall 40. The second wall 44 has a plurality of spaced apart second gaps 46 formed therein. The first gaps 42 and the second gaps 46 are mis-aligned or offset with respect to each other so that fluid is prevented from flowing in a straight line through both a first gap and a second gap. A third wall 48 is formed by the inner roof panel 12 in the collection recess 32 and surrounding the second wall 44. The third wall 48 has a plurality of spaced apart third gaps 50 formed therein. The third gaps 50 and the second gaps 46 are mis-aligned or offset with respect to each other so that fluid is prevented from flowing in a straight line through both a third gap and a second gap.

A plurality of drainage ports 52, 54, 56 and 58 (FIG. 1) are formed in the inner roof panel 12 spaced outwardly from the collection recess 32. A plurality of drainage channels or grooves 60, 62, 64 and 66 are formed in the inner roof panel 12. Each drainage channel extends from a corresponding corner of the collection recess to a corresponding one of the drainage ports 52, 54, 56 and 58. A plurality of drainage tubes (not shown) are preferably coupled to the drainage ports to drain condensation away from the roof assembly 10.

Figure 3:
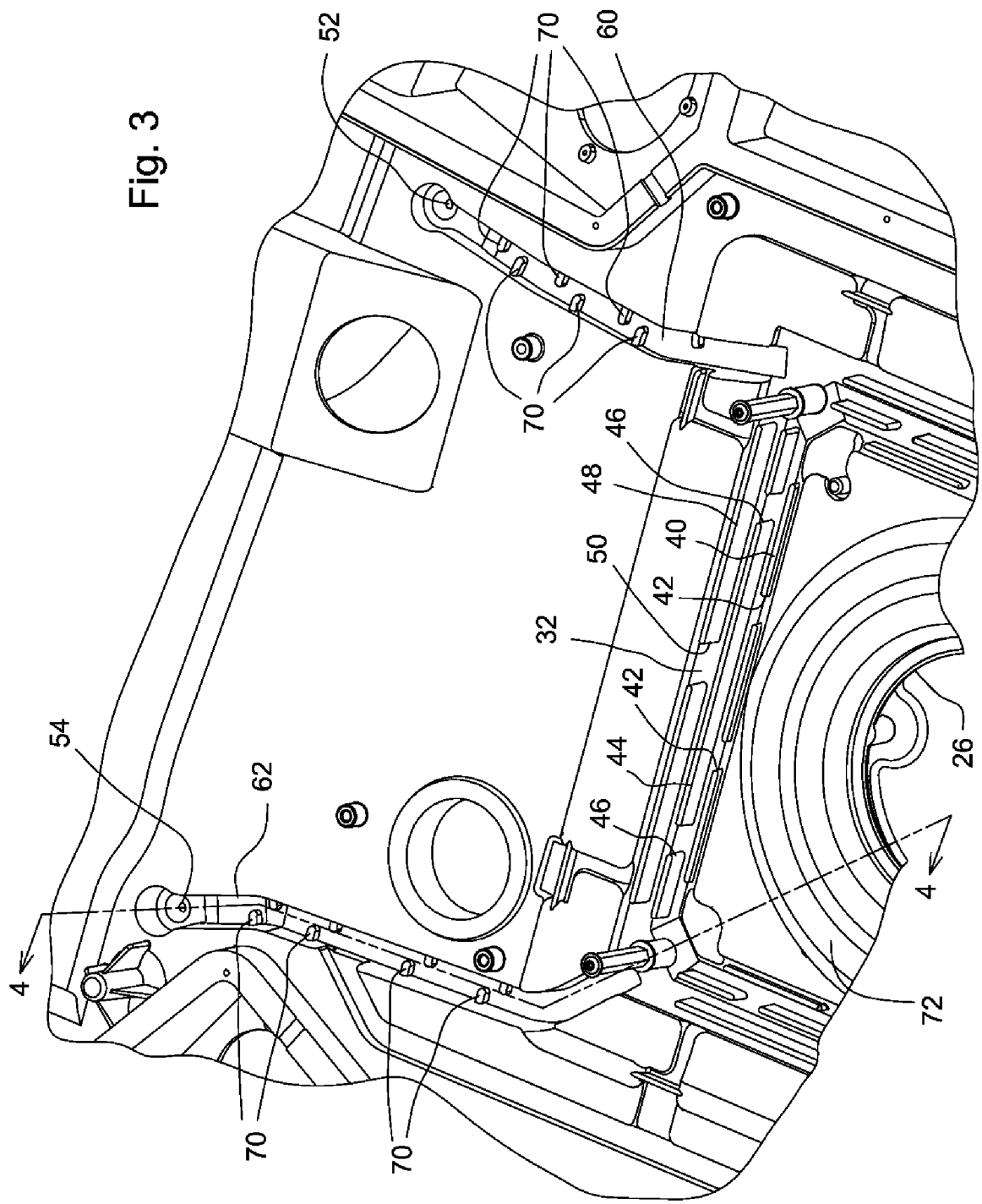
FIG. 3 is an enlarged perspective view of a portion of the inner roof panel of FIG. 1.

As best seen in FIG. 3, each the drain channel 60-66 includes a plurality of dams or ribs 70 which extend partially laterally cross the channel. These partial dams 70 help reduce splashing of condensation in the channels 60-66 as the vehicle travels over rough terrain.

Figure 4:
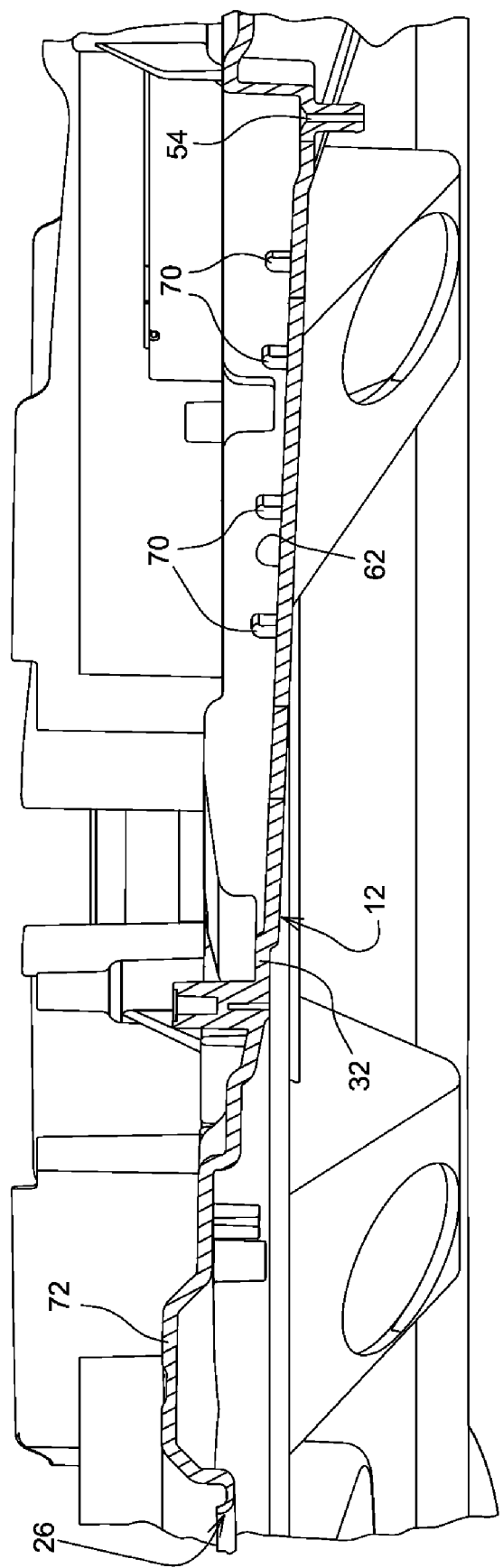
FIG. 4 is a sectional view along lines 4-4 of FIG. 3.

As best seen in FIGS. 3 and 4, the air inlet 26 is surrounded by an annular raised housing part 72. The floor of the groove 62 steps downward and slopes generally downward and away from the raised housing part 72, past the dams 70 to the drainage port 54. Grooves 60, 66 and 68 preferably have a similar profile to their respective drainage ports 52, 56 and 58.

This drainage system helps assure that condensation from the HVAC unit 30, or any other liquid which is present in the compartment 28, is constrained to flow out of the roof through channels 60-66, so that such liquid will not drip through another path and onto the occupants of the cab underneath the roof panel 12.

As best seen in FIG. 1, the inner roof 12 has holes 80-98 through which conditioned air is blown into the operator station. Certain of these holes has a wall 100-110 around it to prevent escaped water from running down one of these holes rather than into one of the channels 52-58.

By having 4 paths for water to escape, the vehicle can run for unlimited time (as long as drains are clear) on a 25° slope without losing containment of the water. By having 4 drains, there is always a way for the water to escape without accumulating. Positive air pressure from the fan of the HVAC unit 30 helps keep the drain channels clean and unplugged.

Because the channels are formed in the roof, the entire inner roof serves to contain and act as a drain for the water without causing any damage. The water will simply run back to a channel where it will be pushed out of the roof by positive air pressure.

Another advantage of the channels is that they address the failure of a heater coil. Such a failure could send several gallons per minute of hot coolant into the roof over the operators head. Such a failure is very remote but not impossible. Most designs simply do not address this failure mode. In this case, however, with 4 channels to collect the liquid and 4 drains to dispose of it, the operator would have several minutes after the failure before any coolant would escape to leak through the roof. In this time, it should be obvious something was wrong from the smell of the coolant and the increasing temperature of the engine.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A drainage system for an HVAC unit mounted on a vehicle roof panel and over an air inlet opening in the roof panel, the drainage system comprising:
    a collection recess formed by the roof panel and surrounding the inlet opening;
    a first wall formed by the roof panel in the collection recess and surrounding the HVAC unit, the first wall having a plurality of spaced apart first gaps formed therein;
    a second wall formed by the roof panel in the collection recess and surrounding the first wall, the second wall having a plurality of spaced apart second gaps formed therein, the first and second gaps being mis-aligned with respect to each other so that fluid is prevented from flowing in a straight line through both a first gap and a second gap;
    a plurality of drainage ports formed in the roof panel; and
    a plurality of drainage grooves formed in the roof panel, each drainage groove communicating the collection recess with a corresponding one of the drainage ports, the walls, gaps and grooves cooperating to communicate fluid from the collection recess to the drainage ports, each drainage groove includes a plurality of dam members formed therein each dam member extending part-way across said drainage groove so as to partially restrict fluid flow through the drainage groove.

2. The drainage system of claim 1, further comprising:
    a third wall formed by the roof panel in the collection recess and surrounding the second wall, the third wall having a plurality of spaced apart third gaps formed therein, the third and second gaps being mis-aligned with respect to each other so that fluid is prevented from flowing in a straight line through both a third gap and a second gap.

3. The drainage system of claim 1, wherein:
    the roof panel forms an annular raised portion surrounding the air inlet opening.

4. The drainage system of claim 3, wherein:
    the collection recess surrounds the annular raised portion.

5. The drainage system of claim 1, wherein:
    the collection recess has a generally rectangular shape and each drainage groove communicates with a corner of the collection recess.

6. A drainage system for an HVAC unit mounted on a vehicle roof panel and over an air inlet opening in the roof panel, the drainage system comprising:
    a collection recess formed by the roof panel and surrounding the inlet opening;
    a plurality of surrounding walls formed by the roof panel in the collection recess and surrounding the HVAC unit, each wall having a gap formed therein, each gap being mis-aligned with respect to the gap in an adjacent wall so that fluid is prevented from flowing in a straight line through gaps in adjacent walls;
    a plurality of drainage ports formed in the inner roof panel; and
    a plurality of drainage grooves formed in the inner roof panel, each drainage groove communicating the collection recess with a corresponding one of the drainage ports, the walls, gaps and grooves cooperating to communicate fluid from the collection recess to the drainage ports, each drainage groove includes a plurality of dam members formed therein, each dam member extending part-way across said drainage groove so as to partially restrict fluid flow through the drainage groove.

* * * * *